United States Patent
Zeman

[19]

[11] Patent Number: 5,864,981
[45] Date of Patent: Feb. 2, 1999

[54] COMBINATION TACKLE BOX, BAIT WELL, AND COOLER

[76] Inventor: Dennis Zeman, 7700 Seashore Dr., Port Richey, Fla. 34668

[21] Appl. No.: 787,950

[22] Filed: Jan. 23, 1997

[51] Int. Cl.[6] ........................... A01K 97/05; A01K 97/06
[52] U.S. Cl. ................... 43/54.1; 206/315.11; 62/457.1; 43/55; 43/57
[58] Field of Search .............................. 206/545, 315.11; 43/54.1, 55, 57; 220/503, 521; 62/457.1

[56] References Cited

U.S. PATENT DOCUMENTS

| | | | |
|---|---|---|---|
| 1,080,551 | 12/1913 | Hartwell . | |
| 3,317,097 | 5/1967 | Giordano . | |
| 3,395,550 | 8/1968 | Dungan | 62/400 |
| 3,591,194 | 7/1971 | Vega . | |
| 4,128,170 | 12/1978 | Elliot | 206/315 |
| 4,353,182 | 10/1982 | Junkas | 43/54.1 |
| 4,841,661 | 6/1989 | Moore | 43/54.1 |
| 4,988,010 | 1/1991 | Pollak | 220/503 |
| 5,305,544 | 4/1994 | Testa, Jr. | 43/54.1 |

*Primary Examiner*—Jack W. Lavinder

[57] ABSTRACT

A new combination tackle box, bait well, and cooler for combining separate fishing equipment into a single multi-function apparatus. The inventive device includes a main body portion divided into an upper bait compartment and an upper cooler compartment, separate lids disposed over each compartment for selectively providing access to each compartment, and drawers slidably disposed below the compartments.

4 Claims, 2 Drawing Sheets

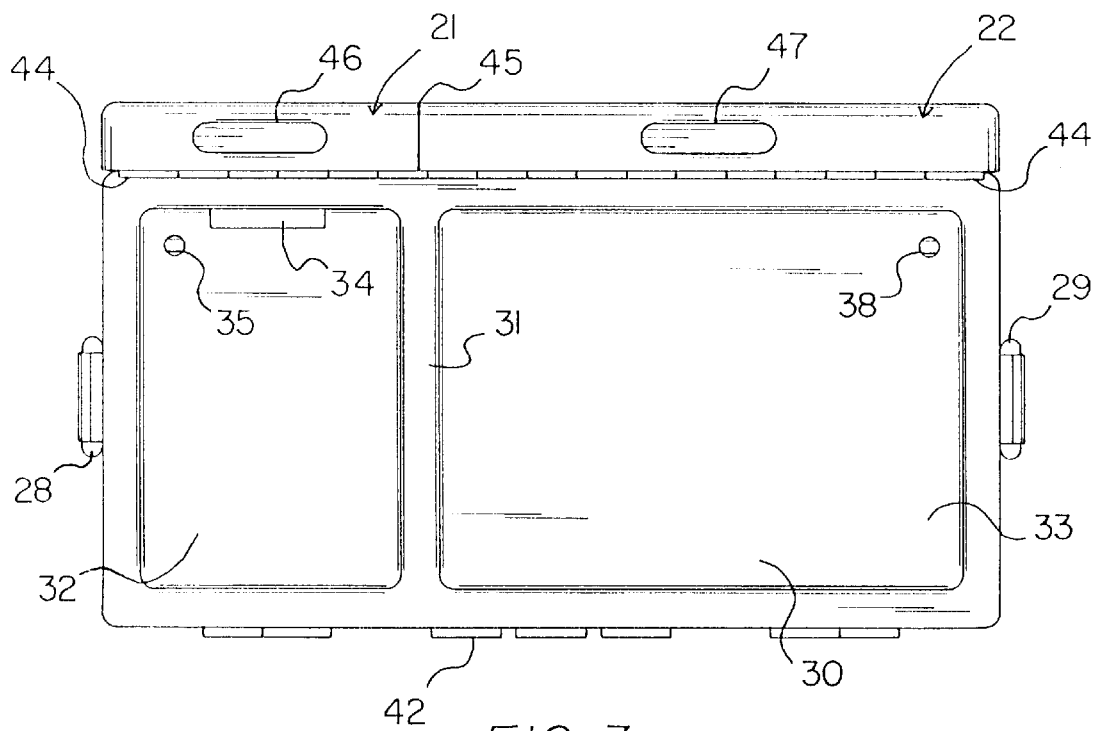
FIG. 3
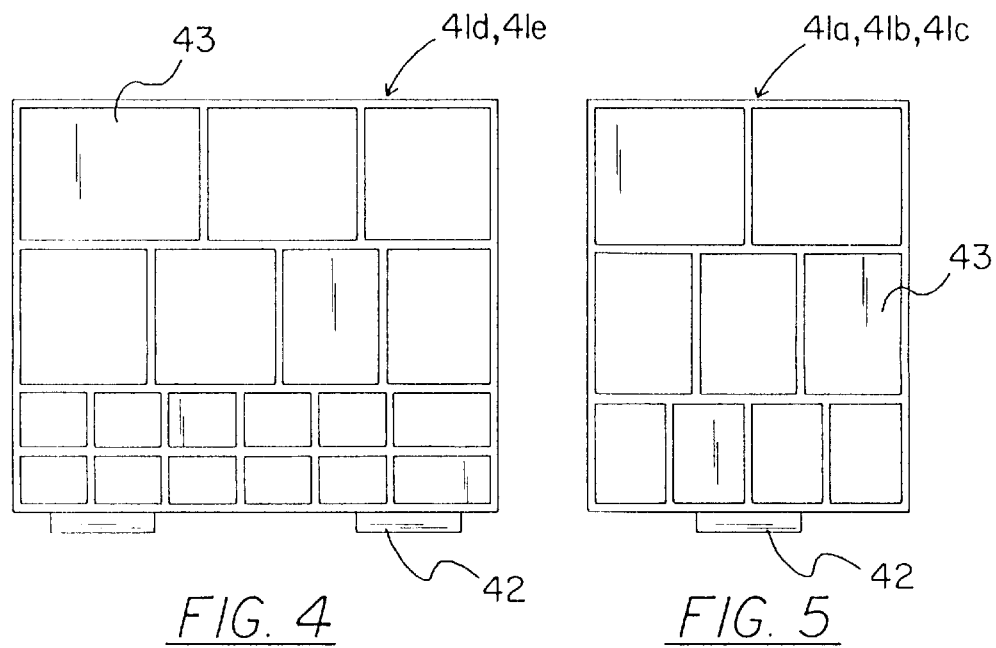
FIG. 4
FIG. 5

COMBINATION TACKLE BOX, BAIT WELL, AND COOLER

BACKGROUND OF THE INVENTION

1. Field of the Invention

The present invention relates to fishing equipment and more particularly pertains to a new combination tackle box, bait well, and cooler for combining separate fishing equipment into a single multi-function unit.

2. Description of the Prior Art

The use of fishing equipment is known in the prior art. More specifically, fishing equipment heretofore devised and utilized is known to consist basically of familiar, expected and obvious structural configurations, notwithstanding the myriad of designs encompassed by the crowded prior art which have been developed for the fulfillment of countless objectives and requirements.

Known prior art fishing equipment include U.S. Pat. No. 5,305,544; U.S. Pat. No. 4,128,170; U.S. Pat. No. 4,353,182; U.S. Pat. No. Des. 290,080; U.S. Pat. No. 4,541,539 and U.S. Pat. No. 4,191,420.

While these devices fulfill their respective, particular objectives and requirements, the aforementioned patents do not disclose a new combination tackle box, bait well, and cooler. The inventive device includes a main body portion divided into an upper bait chamber and an upper cooler chamber, separate lids disposed over each chamber for selectively providing access to each chamber, and drawers slidably disposed below the chambers.

In these respects, the combination tackle box, bait well, and cooler according to the present invention substantially departs from the conventional concepts and designs of the prior art, and in so doing provides an apparatus primarily developed for the purpose of combining separate fishing equipment into a single multi-function unit.

SUMMARY OF THE INVENTION

In view of the foregoing disadvantages inherent in the known types of fishing equipment now present in the prior art, the present invention provides a new combination tackle box, bait well, and cooler construction wherein the same can be utilized for combining separate fishing equipment into a single multi-function unit.

The general purpose of the present invention, which will be described subsequently in greater detail, is to provide a new combination tackle box, bait well, and cooler apparatus and method which has many of the advantages of the fishing equipment mentioned heretofore and many novel features that result in a new combination tackle box, bait well, and cooler which is not anticipated, rendered obvious, suggested, or even implied by any of the prior art fishing equipment, either alone or in any combination thereof.

To attain this, the present invention generally comprises a main body portion divided into an upper bait chamber and an upper cooler chamber, separate lids disposed over each chamber for selectively providing access to each chamber, and drawers slidably disposed below the chambers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new combination tackle box, bait well, and cooler apparatus and method which has many of the advantages of the fishing equipment mentioned heretofore and many novel features that result in a new combination tackle box, bait well, and cooler which is not anticipated, rendered obvious, suggested, or even implied by any of the prior art fishing equipment, either alone or in any combination thereof.

It is another object of the present invention to provide a new combination tackle box, bait well, and cooler which may be easily and efficiently manufactured and marketed.

It is a further object of the present invention to provide a new combination tackle box, bait well, and cooler which is of a durable and reliable construction.

An even further object of the present invention is to provide a new combination tackle box, bait well, and cooler which is susceptible of a low cost of manufacture with regard to both materials and labor, and which accordingly is then susceptible of low prices of sale to the consuming public, thereby making such combination tackle box, bait well, and cooler economically available to the buying public.

Still yet another object of the present invention is to provide a new combination tackle box, bait well, and cooler which provides in the apparatuses and methods of the prior art some of the advantages thereof, while simultaneously overcoming some of the disadvantages normally associated therewith.

Still another object of the present invention is to provide a new combination tackle box, bait well, and cooler for combining separate fishing equipment into a single multi-function unit.

Yet another object of the present invention is to provide a new combination tackle box, bait well, and cooler which includes a main body portion divided into an upper bait chamber and an upper cooler chamber, separate lids disposed over each chamber for selectively providing access to each chamber, and drawers slidably disposed below the chambers.

Still yet another object of the present invention is to provide a new combination tackle box, bait well, and cooler that allows access to either of the bait chamber, cooler chamber, or drawers, without opening the others.

Even still another object of the present invention is to provide a new combination tackle box, bait well, and cooler that saves space and reduces the number of trips required to carry all the fishing equipment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view with the lids in an open position.

FIG. 4 is a view of one of the possible drawer configurations.

FIG. 5 is a view of another possible drawer configuration.

DESCRIPTION OF THE PREFERRED EMBODIMENT

Figure 1:
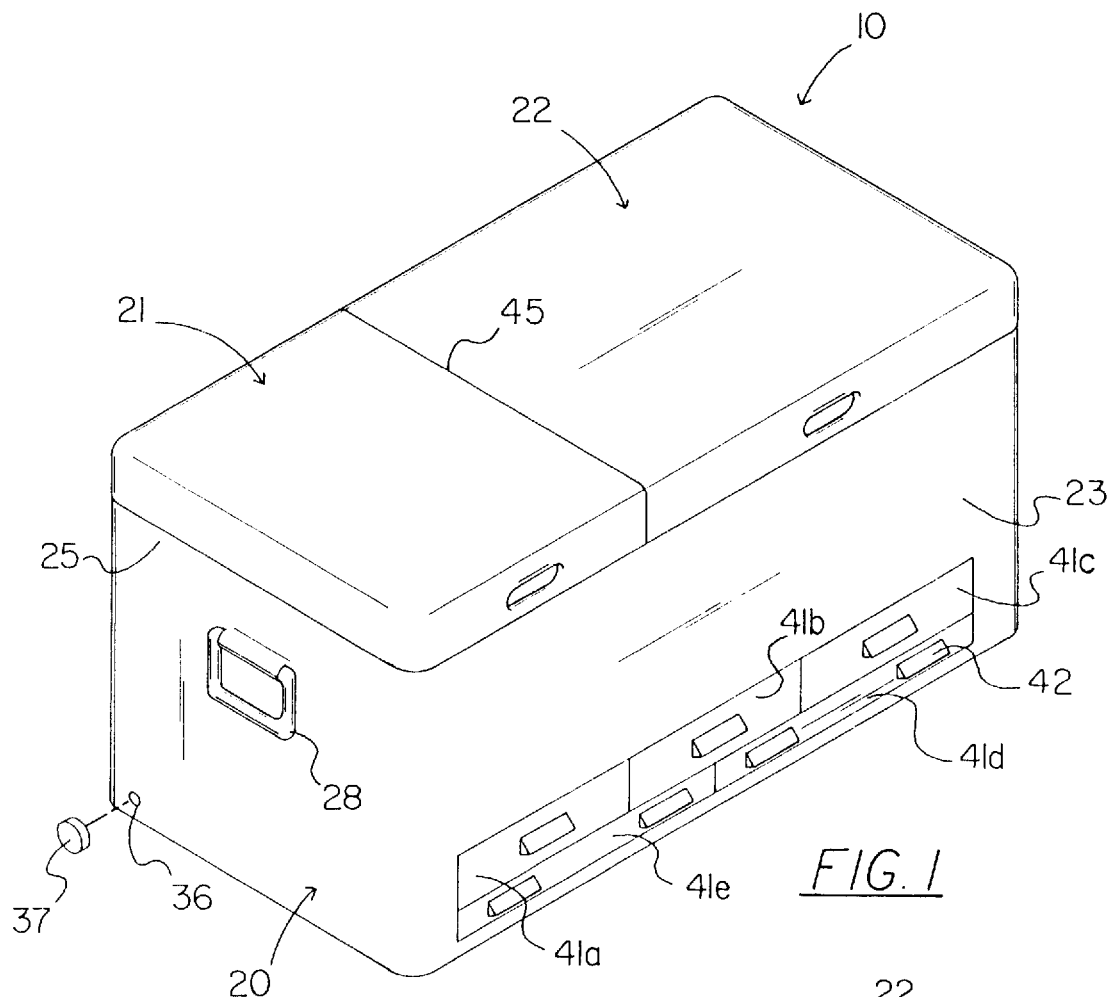
FIG. 1 is a perspective view of a new combination tackle box, bait well, and cooler according to the present invention.
Figure 2:
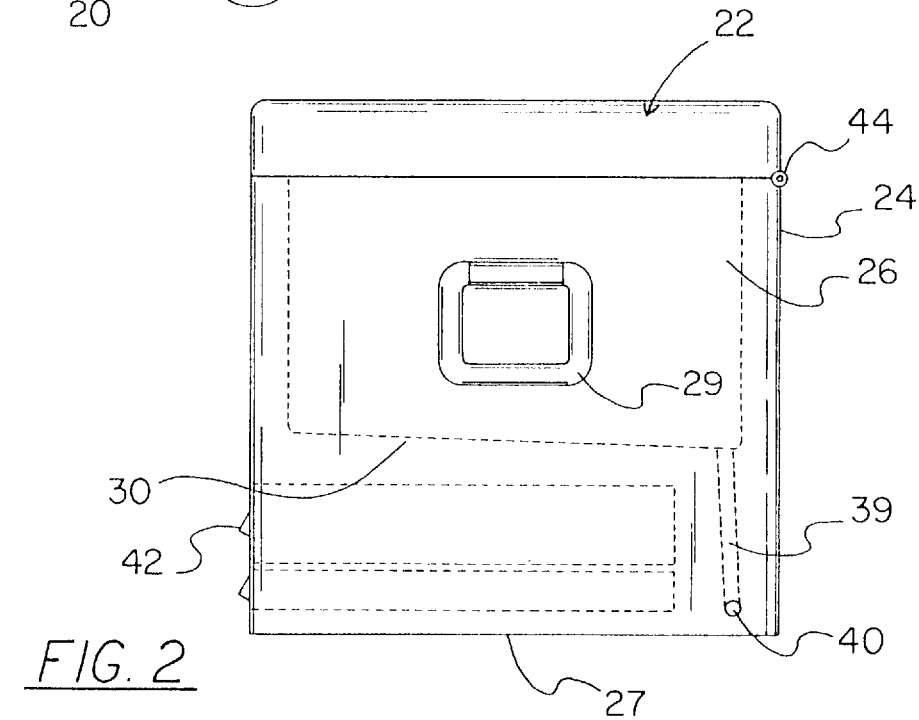
FIG. 2 is a side view thereof.

With reference now to the drawings, and in particular to FIGS. 1 through 5 thereof, a new combination tackle box, bait well, and cooler embodying the principles and concepts of the present invention and generally designated by the reference numeral 10 will be described.

More specifically, it will be noted that the combination tackle box, bait well, and cooler 10 comprises a main body 20 and a pair of lids 21,22 attached to the main body.

As best illustrated in FIGS. 1 through 5, it can be shown that the main body 20 has front and back walls 23,24, side walls 25,26, and a bottom wall 27. Handles 28,29 are pivotally attached to the side walls 25,26 to facilitate carrying of the apparatus.

Inside of the main body 20, a horizontal wall 30 extends between the front and back walls 23,24 and the side walls 25,26 to divide the interior of the main body into upper and lower regions. The upper region includes a vertical dividing wall 31 extending upward from the wall 30 and between the walls 23,24 which divides the upper region into a bait compartment 32 and a cooler compartment 33. As shown, the cooler compartment 33 is larger than the bait compartment 32, although the two compartments could be equally sized, or the compartment 32 could be larger than the compartment 33, depending upon the needs of the individual user.

The compartment 32 includes an aerator apparatus 34 mounted therein for aerating water contained within the compartment. Therefore, bait such as shrimp or minnows can be kept alive within the compartment 32. Aerators are generally known, and include a battery powered aerator pump and an air stone, not specifically shown. Such an apparatus can be mounted anywhere in the compartment, such as on the rear wall 24 or the wall 30. The compartment 32 includes a drain hole 35 extending through the wall 30. The drain hole 35 is appropriately connected by a drain line to an exit hole 36 in the side wall 25. The exit hole 36 is provided with a drain plug 37 of any conventional type, such as a screw-on cap or other type of cap or inserted plug. Therefore water can be drained from the compartment 32 when not in use.

The compartment 33 also includes a drain hole 38 in the wall 30 connected by drain line 39 to an exit hole 40 in the side wall 26. The exit hole 40 will also have a plug (not shown) associated therewith similar to plug 37. Thus liquids within the compartment 33 can be easily drained. The compartment 33 will normally contain food and beverages, and therefore the compartment 33 should be properly insulated to maintain items therein cool.

A plurality of drawers 41a–e are provided in main body portion 20. The drawers extend through the front wall 23 and are slidably supported by the lower region of the main body, below the compartments 32,33. Each drawer 41a–e includes at least one handle 42 attached thereto to facilitate opening and closing movement of the drawers. Thus by pulling on the handles, the drawers slide out through the front wall 23. The drawers should include a means to prevent the drawers from easily opening, such as during transport of the apparatus, but which does not hinder manual opening of the drawers. As shown in FIGS. 4 and 5, the drawers 41a–e can include various compartments 43 to hold accessories, such as fishing tackle, and other miscellaneous items. Although the drawers in FIGS. 4 and 5 are shown as having a specific configuration of compartments, it should be recognized that the drawers can have any arrangement of compartments, including a single compartment.

The lids 21,22 are each separately pivotally attached to the back wall 24, such as by hinges 44. The lids 21,22 include a small gap 45 therebetween, such that the lids can be separately opened and closed, permitting access to one compartment while the other one remains closed. Each lid 21,22 is preferably cushioned, thus providing a seat for the fisherman. Each lid 21,22 includes a handle means 46,47 thereon, so as to facilitate opening of the lids 21,22. Each handle means comprises, for instance, an oval shaped recess formed in the cushion and lid.

In use, desired food and drink are placed within the compartment 33. Live bait is placed within the compartment 32, and the aerator is turned on. Thus the bait will be kept alive for long periods of time, until ready for use. Any tackle and other needed items are placed within the drawers 41a–e. The apparatus can then easily be carried using the handles 28,29 to a desired fishing location, such as on a boat or along the shoreline.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing box comprising:
    a main body portion having a bottom wall, first and second side walls, a back wall, and a front wall, said walls defining an interior;
    a horizontal partition wall within the main body portion, said horizontal partition wall extending between the first and second side, front, and back walls such that said horizontal partition wall divides the interior into upper and lower regions;

a vertical partition wall positioned within the upper region, said vertical partition wall extending upward from the horizontal partition wall and extending between the front and back walls such that the vertical partition wall divides the upper region into a bait compartment and a cooler compartment;

lid means for covering the fishing box, the lid means being pivotally attached to the back wall to selectively cover the bait compartment and the cooler compartment;

aerator means for aerating the bait compartment, said aerator means being disposed inside of the bait compartment;

drawer means adapted for holding accessories, said drawer means extending through the front wall and disposed within the lower region wherein the lid means comprises first and second separate lid portions pivotally attached to the back wall and disposed over the bait compartment and the cooler compartment, respectively, said first and second lid portions being for selectively providing access to the bait compartment and the cooler compartment;

wherein the lid portions are provided with cushioning means for providing a cushioned seal between said lid portions and the bait compartment and cooler compartment;

a number of handles, at least one handle provided on each lid portion;

wherein the drawer means includes drawers slidably disposed within the lower region for sliding movement through the front wall;

wherein the aerator means comprises a battery powered aerator pump, a bait compartment drain hole extending downwardly from said bait compartment, said bait compartment drain hole leading to a bait compartment exit hole, said bait compartment exit hole being positioned on an outside of the main body portion;

a removable bait compartment plug for selectively sealing said bait compartment exit hole;

a cooler compartment drain hole extending downwardly from said cooler compartment, said cooler compartment drain hole leading to a cooler compartment exit hole, said cooler compartment exit hole being positioned on an outside of the main body portion;

a removable cooler compartment plug for selectively sealing said cooler compartment exit hole; and wherein the bait compartment drain hole and the cooler compartment drain hole each extend downwardly behind the drawers.

2. The fishing box of claim 1, further comprising:

a bait compartment drain hole extending downwardly from said bait compartment, said bait compartment drain hole leading to a bait compartment exit hole, said bait compartment exit hole being positioned on an outside of the main body portion; and a removable bait compartment plug for selectively sealing said bait compartment exit hole.

3. The fishing box of claim 1, further comprising:

a cooler compartment drain hole extending downwardly from said cooler compartment, said cooler compartment drain hole leading to a cooler compartment exit hole, said cooler compartment exit hole being positioned on an outside of the main body portion; and a removable cooler compartment plug for selectively sealing said cooler compartment exit hole.

4. The fishing box of claim 1, wherein the drawer means is arranged into a first and second row of drawers, the first row of drawers being positioned over the second row of drawers, the first row of drawers further including three first row drawers, the second row of drawers including two second row drawers, said first row drawers having a first row drawer depth greater than a second row drawer depth of the second row drawers.

* * * * *